(12) United States Patent
Yang et al.

(10) Patent No.: US 12,221,722 B2
(45) Date of Patent: Feb. 11, 2025

(54) MELT ELECTROSPINNING DEVICE AND METHOD

(71) Applicants: China ENFI Engineering Corporation, Beijing (CN); China Silicon Corporation Ltd., Henan (CN)

(72) Inventors: Tao Yang, Beijing (CN); Dazhou Yan, Beijing (CN); Cheng Liu, Beijing (CN); Wenxue Si, Beijing (CN); Qiang Sun, Beijing (CN); Ye Wan, Beijing (CN); Shengxue Zhang, Beijing (CN)

(73) Assignees: China ENFI Engineering Corporation, Beijing (CN); China Silicon Corporation Ltd., Henan (CN)

( * ) Notice: Subject to any disclaimer, the term of this patent is extended or adjusted under 35 U.S.C. 154(b) by 251 days.

(21) Appl. No.: 17/312,846

(22) PCT Filed: Jan. 20, 2020

(86) PCT No.: PCT/CN2020/073284
§ 371 (c)(1),
(2) Date: Jun. 10, 2021

(87) PCT Pub. No.: WO2020/199736
PCT Pub. Date: Oct. 8, 2020

(65) Prior Publication Data
US 2022/0010459 A1 Jan. 13, 2022

(30) Foreign Application Priority Data

Apr. 3, 2019 (CN) .......................... 201910266659.4
Apr. 3, 2019 (CN) .......................... 201910267466.0

(51) Int. Cl.
*D01D 5/00* (2006.01)
*D01D 1/04* (2006.01)
*D01F 9/08* (2006.01)

(52) U.S. Cl.
CPC ............. *D01D 5/0069* (2013.01); *D01D 1/04* (2013.01); *D01D 5/0015* (2013.01); *D01D 5/0092* (2013.01); *D01F 9/08* (2013.01)

(58) Field of Classification Search
CPC ........ D01D 4/022; D01D 5/08; D01D 5/0092; D01D 5/0014; D01D 1/04; D01D 5/0069; D01D 4/02; D01D 5/0007
See application file for complete search history.

(56) References Cited

U.S. PATENT DOCUMENTS

2004/0137225 A1*   7/2004   Balkus, Jr. ........ C04B 35/62231
                                                      428/364
2008/0213417 A1    9/2008   Bryner et al.
(Continued)

FOREIGN PATENT DOCUMENTS

CN        1858308      *  11/2006
CN      101429681 A        5/2009
(Continued)

OTHER PUBLICATIONS

Search Report regarding related PCT App. No. PCT/CN2020/073284; issued Apr. 3, 2019.
(Continued)

*Primary Examiner* — Stella K Yi
(74) *Attorney, Agent, or Firm* — Dickinson Wright PLLC

(57) ABSTRACT

The present disclosure provides a melt electrospinning device. The melt electrospinning device includes a melting unit, a spinning unit, an electrostatic generating unit, a collection unit, and a sealed cavity. A lining of the melting unit is made of a material having a melting point greater than 500° C. The spinning unit is connected to the bottom of the melting unit and includes a spinneret made from a conductive material having a melting point greater than 500° C. The melt electrospinning process is performed in the sealed
(Continued)

cavity. The present disclosure further provides a melt electrospinning method.

4 Claims, 3 Drawing Sheets

(56) References Cited

U.S. PATENT DOCUMENTS

| | | | |
|---|---|---|---|
| 2010/0212727 A1 | | 8/2010 | Lee |
| 2011/0151736 A1* | | 6/2011 | Lee ............... D04H 1/4242 977/773 |

FOREIGN PATENT DOCUMENTS

| | | | |
|---|---|---|---|
| CN | 101518764 A | | 9/2009 |
| CN | 101883882 A | | 11/2010 |
| CN | 201933210 U | | 8/2011 |
| CN | 102828259 A | | 12/2012 |
| CN | 102877218 A | | 1/2013 |
| CN | 104264265 | * | 1/2015 |
| CN | 104328514 A | | 2/2015 |
| CN | 105734695 A | | 7/2016 |
| CN | 205661013 U | | 10/2016 |
| CN | 106435827 A | | 2/2017 |
| CN | 108823652 A | | 11/2018 |
| CN | 109097842 A | | 12/2018 |
| CN | 109457305 A | | 3/2019 |
| CN | 109881270 A | | 6/2019 |
| JP | 2006089887 A | | 4/2006 |
| JP | 5698509 | * | 4/2015 |
| KR | 101479759 | * | 1/2015 |
| WO | WO 2011100743 | * | 8/2011 |

OTHER PUBLICATIONS

First Office Action regarding corresponding CN App. No. 20190267466.0; dated Mar. 3, 2021.

Second Office Action regarding corresponding CN App. No. 20190267466.0; dated Oct. 21, 2020.

English Translation of Office Action regarding corresponding EG Pat. App. No. 579/2021; mailed Jan. 22, 2024.

Second Office Action and Translation dated Dec. 20, 2024 corresponding to Chinese Application No. 2019102666594, 9 pages.

* cited by examiner

MELT ELECTROSPINNING DEVICE AND METHOD

CROSS REFERENCE

This application is based upon PCT patent application No. PCT/CN2020/073284, filed on Jan. 20, 2020, which claims priority to Chinese Patent Application Nos. 201910267466.0 and 201910266659.4, filed on Apr. 3, 2019, the entire contents of which are incorporated herein by reference.

TECHNICAL FIELD

The present disclosure relates to the field of electrospinning, and in particular, to a melt electrospinning device and a melt electrospinning method.

BACKGROUND

Electrospinning technologies are mainly divided into solution electrospinning and melt electrospinning. In recent years, solution electrospinning has developed rapidly, and nanofibers can be prepared. However, there are problems such as low production efficiency, solvent recovery or emission pollution etc. In contrast, melt electrospinning technologies can make up for the shortcomings of solution electrospinning to some extent, so melt electrospinning has also become a new hot spot.

Melt electrospinning directly uses a melt of the target material as raw material, no additional solvent, and the viscosity of the melt is higher than the solution, which can overcome the instability of the fiber in the electrostatic field, and it is expected to obtain fibers with better orientation. Melt electrospinning have become a good choice for the preparation of nanofibers. However, the current technology and equipment for melt electrospinning are immature, mainly based on self-design and construction. All spinning technologies are mostly aimed at polymer materials, have the working temperature of only up to 200-300° C., and cannot handle inorganic materials with melting points of thousands of degrees Celsius. There are no equipments and related reports for the melt electrospinning of ultra-high temperature inorganic system, so the existing spinning technology and equipment cannot realize simple, efficient and low-cost preparation of fibers.

SUMMARY

The present disclosure provides a device and method capable of melt electrospinning using an inorganic material as a raw material.

The present disclosure provides a melt electrospinning device. The melt electrospinning device includes a melting unit, a spinning unit, an electrostatic generating unit, a collection unit, and a sealed cavity. A lining of the melting unit is made of a material having a melting point greater than 500° C. The spinning unit is connected to the bottom of the melting unit and includes a spinneret made from a conductive material having a melting point greater than 500° C. The melt electrospinning process is performed in the sealed cavity.

According to an exemplary arrangement of the disclosure, the lining of the melting unit is made of one or more materials selected from the group consisting of quartz, graphite, silicon nitride, silicon carbide, boron nitride, tungsten carbide, tungsten, molybdenum, and titanium boride.

According to an exemplary arrangement of the disclosure, the spinneret is made of one or more materials selected from graphite, tungsten, molybdenum and titanium boride.

According to an exemplary arrangement of the disclosure, the spinning unit includes one or more spinnerets.

According to an exemplary arrangement of the disclosure, an orifice of the spinneret is 0.5-3 mm in diameter, preferably 0.8-2.5 mm.

According to an exemplary arrangement of the disclosure, a static voltage of the electrostatic generating unit ranges from 0 to 70 kV.

According to an exemplary arrangement of the disclosure, a distance from an orifice of the spinneret to the collection unit is 100-300 mm.

According to an exemplary arrangement of the disclosure, the sealed cavity is provided with an interlayer, and the interlayer is provided with circulating cooling water.

According to an exemplary arrangement of the disclosure, the melt electrospinning device further includes a powder feeding unit, which is composed of a screw feeder and a vacuum transition cavity.

According to an exemplary arrangement of the disclosure, the melt electrospinning device further includes a vacuum unit connected to the closed cavity, the vacuum unit includes a vacuum pump, and the vacuum pump is selected from a diffusion pump or a molecular pump.

According to an exemplary arrangement of the disclosure, the melt electrospinning device further includes a temperature measurement and control unit.

According to an exemplary arrangement of the disclosure, the melt electrospinning device further includes a pressure measurement and control unit, and the pressure measurement and control unit is respectively connected to the sealed cavity and the melting unit, and includes a pressure measuring instrument and a gas intake system.

The present disclosure further provides a melt electrospinning method, comprising: S1, heating an inorganic material to a molten state to form a melt; and S2, shaping the melt into fibers by electrospinning.

According to an exemplary arrangement of the disclosure, the inorganic material is selected from one or more of silicon, germanium, tin, and tin dioxide.

According to an exemplary arrangement of the disclosure, a voltage of the electrospinning is set to be 10-50 kV, preferably 12-45 kV, more preferably 20-40 kV.

According to an exemplary arrangement of the present disclosure, a flow rate of the melt during the electrospinning process is 1-10 µL/min, preferably 2-8 µL/min, more preferably 2.5-5 µL/min.

According to an exemplary arrangement of the disclosure, the melt is subjected to electrospinning under vacuum, an inert atmosphere or a reductive atmosphere. The inert atmosphere is selected from one or more of nitrogen and argon. The reductive atmosphere comprises hydrogen.

According to an exemplary arrangement of the present disclosure, the melt electrospinning is carried out at an ambient temperature of not higher than 100° C. and a pressure of normal pressure.

According to an exemplary arrangement of the disclosure, the melt electrospinning is carried out through one or more spinnerets.

BRIEF DESCRIPTION OF THE DRAWINGS

The above and other features and advantages of the present disclosure will become more apparent from the detailed description of the exemplary arrangements.

Figure 1:
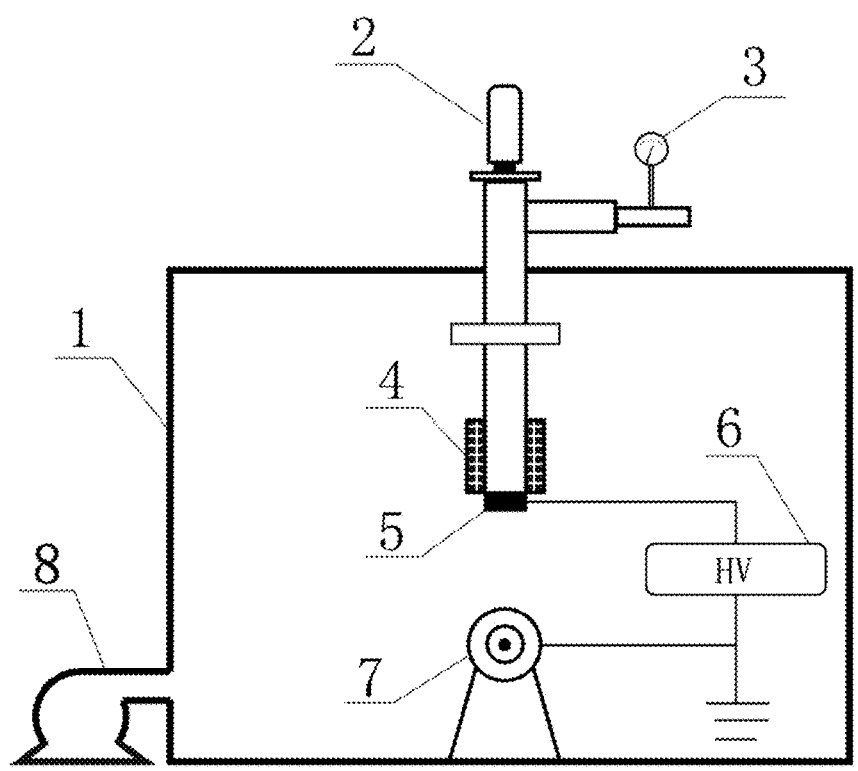
FIG. 1 is a structural representation showing a melt electrospinning device according to an exemplary arrangement of the present disclosure.

Reference numerals are illustrated as follows.

1-Sealed Cavity; 2-Temperature Measurement and Control Unit; 3-Pressure Measurement and Control Unit; 4-Melting Unit; 41-Heating Sleeve; 42-Lining; 5-Spinning Unit; 6-Electrostatic Generating Unit; 7-Collection Unit; 8-Vacuum Unit; 9-Melt; 10-Fiber

DETAILED DESCRIPTION

The present disclosure will be described in detail below in conjunction with specific arrangements.

As shown in FIG. 1, the melt electrospinning device of the present disclosure comprises a melting unit 4, a spinning unit 5, an electrostatic generating unit 6, a collecting unit 7, and a sealed cavity 1.

Figure 2:
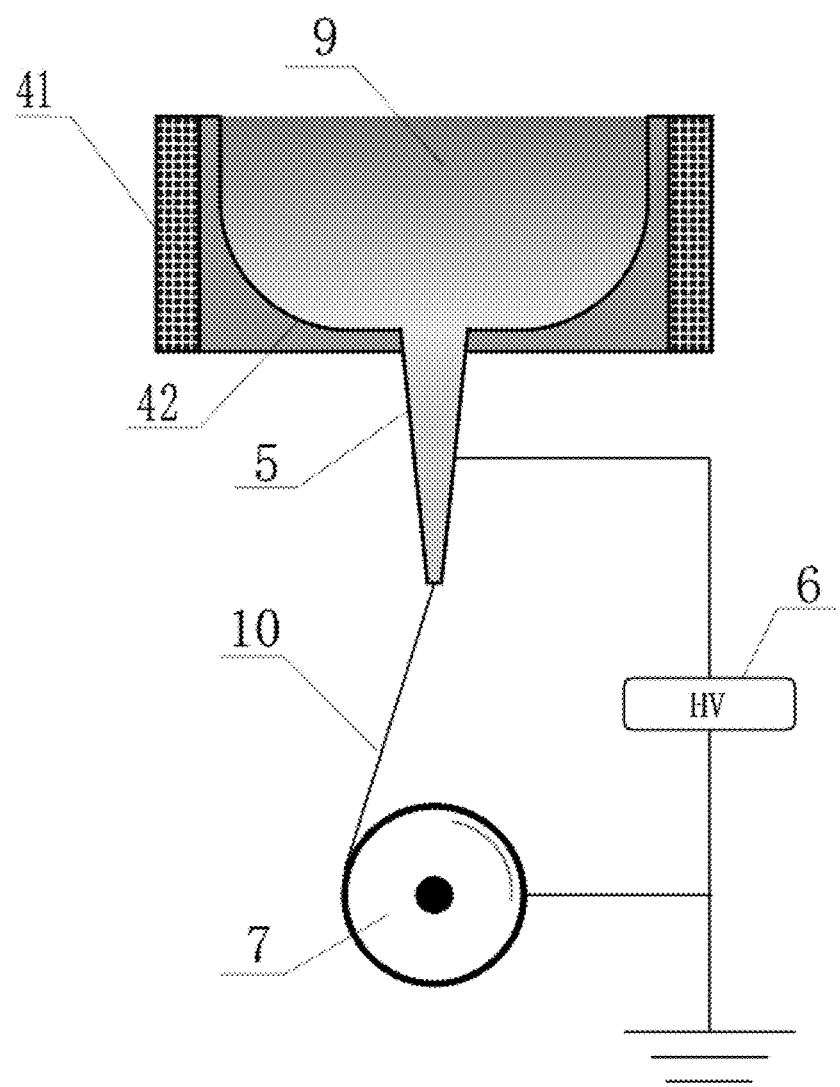
FIG. 2 is an enlarged structural representation showing a part of a melt electrospinning device according to an exemplary arrangement of the present disclosure.

Specifically, the melting unit 4 is used to heat a raw material to form a melt. As shown in FIG. 2, the melting unit 4 may include a heating sleeve 41 and a lining 42. The heating sleeve 41 can be, but is not limited to, a graphite electric resistance furnace or an induction furnace, and the heating power and temperature are controlled by input current and voltage. The inner lining 42 is made of a heat resistant material, preferably a material having a melting point greater than 500° C. It is ensured that the lining will not melt or react with the pretreated inorganic material during the process of forming into a melt, and those skilled in the art can select a suitable lining material according to the kind and the melting point of the inorganic material. Preferably, the melting point of the lining material is more than 200° C. higher than the melting point of the pretreated inorganic material. An alternative lining material may be, but not limited to, one or more selected from the group consisting of quartz, graphite, silicon nitride, silicon carbide, boron nitride, tungsten carbide, tungsten, molybdenum and titanium boride. The raw material forms a melt 9 in the melting unit 4 (as shown in FIG. 2). The upper end of the melting unit 4 may also be connected to a powder feeding unit (not shown). The powder feeding unit conveys the raw material to the melting unit 4. The powder feed unit can comprise a screw feeder and a vacuum transition cavity. The raw material powder enters the vacuum transition cavity through the screw feeder and is then sent to the melting unit 4. The melting unit 4 can also be connected to a temperature measurement and control unit 2 for measuring and controlling the temperature of the melting unit 4. The temperature of the melting unit can be measured using an infrared thermometer or a high temperature thermocouple. An opening is provided with at the bottom of the melting unit 4, and the melt in the inner lining 42 flows into the spinning unit 5 through the opening.

The spinning unit 5 includes a spinneret made of a high temperature resistant and conductive material. The spinning unit 5 is connected to the bottom of the melting unit 4, including a spinneret made of a conductive material having a melting point greater than 500° C. The high temperature resistant material may be, but is not limited to, one or more of graphite, tungsten, molybdenum, and titanium boride. The spinneret can be connected to the bottom opening of the melting unit 4 by threads thereon. The spinneret can be tapered and the inner diameter of the orifice is from 0.5 to 3 mm, preferably from 0.8 to 2.5 mm. The melting unit 4 can include a single spinneret or a plurality of spinnerets. The number of spinnerets can be appropriately set according to the fiber production requirements. The melting unit 4 and the spinneret can be designed as a program-controlled three-dimensional motion.

The electrostatic generating unit 6 is used for supplying an electric field for electrospinning, and is connected to the spinneret of the spinning unit 5 and the collecting unit 7 respectively. The electrostatic generating unit 6 may be a commercially high-voltage electrostatic generating device for solution electrospinning, and has a static voltage range from 0 to 70 kV.

As shown in FIGS. 1 and 2, the collecting unit 7 is used to collect the product formed by electrospinning, i.e., the produced fiber 10. The collecting unit 7 may specifically be a collector. The collector may be a copper roller shaft covered with an insulating and heat-resistant material. The rotation speed, the translation speed and displacement are controlled by a program. The distance from the orifice of the spinneret to the colleting unit 7 is 100-300 mm. The collector can also be in the form of a flat plate or other forms, and the operating form of the collector can also be controlled by other programs. The operating form of the collector cooperates with the operating form of the melting unit 4 and the spinneret to enforce that the collected fibers are formed in a predetermined orientation, such as shaping a fabric or the like.

The sealed cavity 1 is used to carry out the melt electrospinning process therein, avoiding the high temperature melt being oxidized by oxygen during the spinning process. Therefore, the sealed cavity 1 is connected to a vacuum unit 8. The sealed cavity 1 is evacuated by the vacuum unit 8 and then filled with an inert gas, and the electrospinning process is carried out under the protection of an inert atmosphere. The vacuum unit 8 may be composed of a vacuum pump, which may be a diffusion pump or a molecular pump. The sealed cavity 1 is also connected to a gas intake system (not shown). The intake system can be used in combination with the vacuum unit 8, or it can be used alone. When used in combination, the gas of the sealed cavity 1 is evacuated by the vacuum unit 8, and the intake system blows an inert gas into the sealed cavity 1. When used alone, an inert gas is directly blown into the sealed cavity 1 by the intake system to displace oxygen. In order to avoid that the materials are oxidized during the electrospinning process, as shown in FIG. 1, the melting unit 4, the spinning unit 5 and the electrostatic generating unit 6 may be installed in the sealed cavity 1. Also, the melting unit 4 and the portions of the spinning unit 5 may be provided outside the sealed cavity 1, and only the orifice of the spinneret of the spinning unit 5, the static generating unit 6, and the collecting unit 1 are provided in the sealed cavity 1 to isolate the materials from oxygen. The configurations of the melting unit 1, the spinning unit 5, and the electrostatic generating unit 6 are not limited to the above two ways, and may be other ways, as long as the electrospinning process occurs in the sealed cavity 1. The closed cavity 1 can also be provided with an interlayer through which cooling water is circulated to control the temperature inside the sealed cavity 1.

The melt electrospinning device of the present disclosure may further comprise a pressure measuring and controlling unit 3 connected to the sealed cavity 1 and the melting unit 4, respectively, to control an extrusion flow rate the melt 9 inside the melting unit 4 by independently controlling their pressure.

Figure 3:
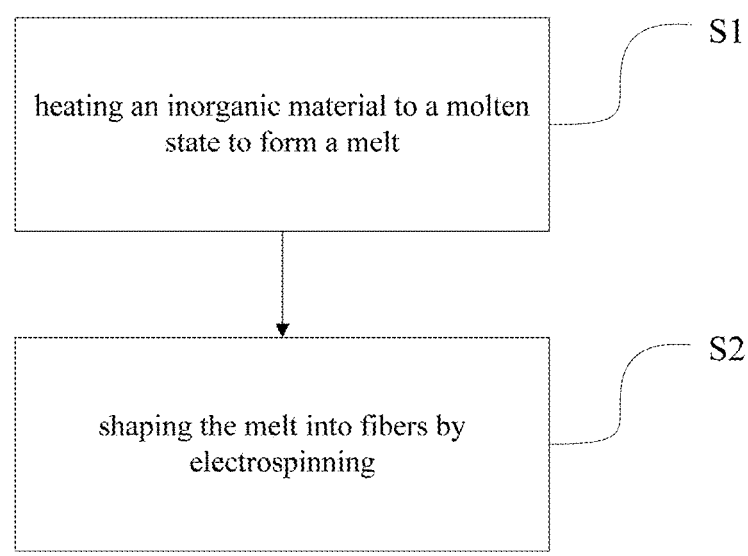
FIG. 3 is a flow chart showing a melt electrospinning method according to an exemplary arrangement of the present disclosure.

As shown in FIG. 3, the melt electrospinning method of the present disclosure comprises: S1, heating an inorganic material to a molten state to form a melt; and S2, shaping the melt into fibers by electrospinning.

The raw material powder is transported from the screw feeder to the vacuum transition cavity, in which the oxygen is completely replaced by pre-vacuation and inert or reductive-gas purge, and then sent to the melting unit 4 before the step S1.

In the step S1, the raw material is heated to a molten state in the molten unit 4 to form a melt 9.

In the step S2, the melt 9 in the melting unit 4 is set under a certain pressure by a pressure control system to extrude the melt 9 at a certain flow rate from the spinneret, and droplets are formed at the orifice. The voltage for electrospinning is set to 10 to 50 kV, preferably 12 to 45 kV, more preferably 20 to 40 kV. The flow rate of the melt during the electrospinning is 1-10 µL/min, preferably 2-8 µL/min, more preferably 2.5-5 µL/min. In the sealed cavity 1 filled with an inert gas, the melt droplets form Taylor cones under the action of high-voltage electrostatic, and are further stretched to form jets, which gradually become smaller in diameter and becomes nanofibers. The fibers gradually cool and solidify during the formation and reach the collection unit 7, which may be a roller collector that can rotate at a certain speed. In the electrospinning process, the ambient temperature in the sealed cavity 1 is preferably not higher than 100° C., and the pressure is normal pressure. Spinning termination can be achieved by changing the melt extrusion pressure. If the extrusion pressure is reduced, the melt cannot flow out of the spinneret spontaneously, that is, the termination of the spinning process is achieved.

The concept of the present disclosure is explained below in combination with specific arrangements.

Using the device shown in FIGS. 1 and 2, silicon/tin fibers were prepared from silicon powder (particle size 30-200 µm)/tin powder (30-150 µm). The product characterization results showed that the fiber diameter ranged from 50 nm to 1500 nm.

EXAMPLE 1

All valves of the device were closed, the vacuum pump was turned on, and the pressure inside the cavity was evacuated below 4 Pa. The vacuum pump valve was turned off, the argon valve was turned on, and the pressure in the cavity was resumed to the normal value. Evacuation and argon purge were repeated twice. The cavity was maintained at the argon atmosphere and normal pressure, 10 g of silicon powder was added to the crucible through the feeding system and heated to about 1420° C. to melt. The pressure of the crucible was adjusted to extrude the melt at a flow rate of 1 µL/min. The spinneret was 150 mm away from the collector, and spinning was performed at a voltage of 10 kV. It was visible to the naked eye that the fibrous substance extended from the orifice to the collector. After products were collected for 1 h, the samples were taken out and characterized by microscopy. The results showed that the diameter of the produced silicon nanofibers was 1000-1500 nm.

EXAMPLE 2

All valves of the device were closed, the vacuum pump was turned on, and the pressure inside the cavity was evacuated below 4 Pa. The vacuum pump valve was turned off, the argon valve was turned on, and the pressure in the cavity was resumed to the normal value. Evacuation and argon purge were repeated twice. The cavity was maintained at the argon atmosphere and normal pressure, 10 g of silicon powder was added to the crucible through the feeding system and heated to about 1420° C. to melt. The pressure of the crucible was adjusted to extrude the melt at a flow rate of 2 µL/min. The spinneret was 150 mm away from the collector, and spinning was performed at a voltage of 12 kV. It was visible to the naked eye that the fibrous substance extended from the orifice to the collector. After products were collected for 1 h, the samples were taken out and characterized by microscopy. The results showed that the diameter of the produced silicon nanofibers was 500-800 nm.

EXAMPLE 3

All valves of the device were closed, the vacuum pump was turned on, and the pressure inside the cavity was evacuated below 4 Pa. The vacuum pump valve was turned off, the argon valve was turned on, and the pressure in the cavity was resumed to the normal value. Evacuation and argon purge were repeated twice. The cavity was maintained at the argon atmosphere and normal pressure, 10 g of silicon powder was added to the crucible through the feeding system and heated to about 1420° C. to melt. The pressure of the crucible was adjusted to extrude the melt at a flow rate of 5 µL/min. The spinneret was 150 mm away from the collector, and spinning was performed at a voltage of 20 kV. It was visible to the naked eye that the fibrous substance extended from the orifice to the collector. After products were collected for 1 h, the samples were taken out and characterized by microscopy. The results showed that the diameter of the produced silicon nanofibers was 200-400 nm.

EXAMPLE 4

All valves of the device were closed, the vacuum pump was turned on, and the pressure inside the cavity was evacuated below 4 Pa. The vacuum pump valve was turned off, the argon valve was turned on, and the pressure in the cavity was resumed to the normal value. Evacuation and argon purge were repeated twice. The cavity was maintained at the argon atmosphere and normal pressure, 10 g of silicon powder was added to the crucible through the feeding system and heated to about 1510° C. to melt. The pressure of the crucible was adjusted to extrude the melt at a flow rate of 5 µL/min. The spinneret was 150 mm away from the collector, and spinning was performed at a voltage of 20 kV. It was visible to the naked eye that the fibrous substance extended from the orifice to the collector. After products were collected for 1 h, the samples were taken out and characterized by microscopy. The results showed that the diameter of the produced silicon nanofibers was 150-350 nm.

EXAMPLE 5

All valves of the device were closed, the vacuum pump was turned on, and the pressure inside the cavity was evacuated below 4 Pa. The vacuum pump valve was turned off, the hydrogen valve was turned on, and the pressure in the cavity was resumed to the normal value. Evacuation and hydrogen purge were repeated twice. The cavity was maintained at the hydrogen atmosphere and normal pressure, 10 g of silicon powder was added to the crucible through the feeding system and heated to about 1510° C. to melt. The pressure of the crucible was adjusted to extrude the melt at a flow rate of 8 μL/min. The spinneret was 150 mm away from the collector, and spinning was performed at a voltage of 30 kV. It was visible to the naked eye that the fibrous substance extended from the orifice to the collector. After products were collected for 1 h, the samples were taken out and characterized by microscopy. The results showed that the diameter of the produced silicon nanofibers was 100-400 nm.

EXAMPLE 6

All valves of the device were closed, the vacuum pump was turned on, and the pressure inside the cavity was evacuated below 4 Pa. The vacuum pump valve was turned off, the hydrogen valve was turned on, and the pressure in the cavity was resumed to the normal value. Evacuation and hydrogen purge were repeated twice. The cavity was maintained at the hydrogen atmosphere and normal pressure, 10 g of silicon powder was added to the crucible through the feeding system and heated to about 1510° C. to melt. The pressure of the crucible was adjusted to extrude the melt at a flow rate of 2.5 μL/min. The spinneret was 150 mm away from the collector, and spinning was performed at a voltage of 40 kV. It was visible to the naked eye that the fibrous substance extended from the orifice to the collector. After products were collected for 1 h, the samples were taken out and characterized by microscopy. The results showed that the diameter of the produced silicon nanofibers was 50-200 nm.

EXAMPLE 7

All valves of the device were closed, the vacuum pump was turned on, and the pressure inside the cavity was evacuated below 4 Pa. The vacuum pump valve was turned off, the hydrogen valve was turned on, and the pressure in the cavity was resumed to the normal value. Evacuation and hydrogen purge were repeated twice. The cavity was maintained at the hydrogen atmosphere and normal pressure, 10 g of silicon powder was added to the crucible through the feeding system and heated to about 1510° C. to melt. The pressure of the crucible was adjusted to extrude the melt at a flow rate of 2.5 μL/min. The spinneret was 150 mm away from the collector, and spinning was performed at a voltage of 45 kV. It was visible to the naked eye that the fibrous substance extended from the orifice to the collector. After products were collected for 1 h, the samples were taken out and characterized by microscopy. The results showed that the diameter of the produced silicon nanofibers was 50-150 nm.

EXAMPLE 8

All valves of the device were closed, the vacuum pump was turned on, and the pressure inside the cavity was evacuated below 4 Pa. The vacuum pump valve was turned off, the hydrogen valve was turned on, and the pressure in the cavity was resumed to the normal value. Evacuation and hydrogen purge were repeated twice. The cavity was maintained at the hydrogen atmosphere and normal pressure, 10 g of silicon powder was added to the crucible through the feeding system and heated to about 1510° C. to melt. The pressure of the crucible was adjusted to extrude the melt at a flow rate of 10 μL/min. The spinneret was 150 mm away from the collector, and spinning was performed at a voltage of 50 kV. It was visible to the naked eye that the fibrous substance extended from the orifice to the collector. After products were collected for 1 h, the samples were taken out and characterized by microscopy. The results showed that the diameter of the produced silicon nanofibers was 100-250 nm.

EXAMPLE 9

All valves of the device were closed, the vacuum pump was turned on, and the pressure inside the cavity was evacuated below 4 Pa. The vacuum pump valve was turned off, the nitrogen valve was turned on, and the pressure in the cavity was resumed to the normal value. Evacuation and nitrogen purge were repeated twice. The cavity was maintained at the nitrogen atmosphere and normal pressure, 30 g of tin powder was added to the crucible through the feeding system and heated to about 250° C. to melt. The pressure of the crucible was adjusted to extrude the melt at a flow rate of 5 μL/min. The spinneret was 150 mm away from the collector, and spinning was performed at a voltage of 30 kV. It was visible to the naked eye that the fibrous substance extended from the orifice to the collector. After products were collected for 1 h, the samples were taken out and characterized by microscopy. The results showed that the diameter of the produced tin nanofibers was 130-300 nm.

The preferred arrangements of the disclosure disclosed above are merely illustrative of the disclosure. The preferred arrangements are not to be considered in all detail, and the disclosure is not limited to the specific arrangements. Obviously, many modifications and variations are possible in light of the teachings herein. The present disclosure has been chosen and described in detail to explain the arrangements of the disclosure and the disclosure. The disclosure is to be limited only by the scope of the appended claims and the appended claims.

What is claimed is:

1. A melt electrospinning method, comprising:
heating an inorganic material to a molten state to form a melt;
shaping the melt into fibers by electrospinning,
wherein the inorganic material is silicon or tin;
a flow rate of the melt during the electrospinning process is 2-10 μL/min;
wherein the melt electrospinning is carried out under vacuum, an inert atmosphere or a reductive atmosphere, the inert atmosphere is selected from one or more of nitrogen and argon, the reductive atmosphere comprises hydrogen; and
wherein the melt electrospinning is carried out at an ambient temperature of not higher than 100° C. and a pressure of normal pressure.

2. The melt electrospinning method according to claim 1, wherein a voltage of the electrospinning is set to be 10-50 kV.

3. The melt electrospinning method according to claim 1, wherein a flow rate of the melt during the electrospinning process is 2-8 μL/min.

4. The melt electrospinning method according to claim 1, wherein the melt electrospinning is carried out through one or more spinnerets.

* * * * *